(12) United States Patent
Madhav et al.

(10) Patent No.: US 11,434,003 B2
(45) Date of Patent: Sep. 6, 2022

(54) DRONE DETERRENCE SYSTEM, METHOD, AND ASSEMBLY

(71) Applicant: THE BOEING COMPANY, Chicago, IL (US)

(72) Inventors: Jagdish T. Madhav, Bothell, WA (US); Lionel Cain, Everett, WA (US)

(73) Assignee: The Boeing Company, Chicago, IL (US)

( * ) Notice: Subject to any disclaimer, the term of this patent is extended or adjusted under 35 U.S.C. 154(b) by 570 days.

(21) Appl. No.: 15/176,340

(22) Filed: Jun. 8, 2016

(65) Prior Publication Data

US 2017/0359554 A1 Dec. 14, 2017

(51) Int. Cl.
*B64C 39/02* (2006.01)
*H04N 7/18* (2006.01)
*G08B 13/196* (2006.01)

(52) U.S. Cl.
CPC ........ *B64C 39/024* (2013.01); *G08B 13/1965* (2013.01); *H04N 7/185* (2013.01)

(58) Field of Classification Search
CPC .......... G06T 7/20; H04N 19/43; H04N 19/51; H04N 19/56; G08B 13/196; G08B 13/19602; G08B 13/19604; G08B 13/19608; G01S 13/04; G01S 13/02; G01S 13/50; G01S 13/524; G01S 13/58; G01S 13/66; G01S 13/72; G01S 13/91; G01S 13/92; G01S 13/916; G01S 13/9303; G01S 13/86; G01S 13/865; G01S 13/867; G01S 7/003; G01S 7/006; G01S 7/42; G01S 7/52046; G01S 7/537; B64D 45/015; B64D 47/06; B64D 47/00

USPC .......................................................... 342/14
See application file for complete search history.

(56) References Cited

U.S. PATENT DOCUMENTS

| | | | |
|---|---|---|---|
| 2002/0190891 A1* | 12/2002 | Viana ................. | B60K 31/0008 342/27 |
| 2003/0076488 A1* | 4/2003 | Arnold .................... | G01S 1/045 342/58 |
| 2008/0157965 A1* | 7/2008 | Shahar ..................... | G01V 8/20 340/556 |
| 2010/0001508 A1* | 1/2010 | Tompkin ................ | D21H 21/44 283/85 |
| 2010/0082180 A1* | 4/2010 | Wright .............. | B60W 50/0098 701/1 |
| 2016/0050889 A1* | 2/2016 | Wenger ..................... | G06T 7/20 348/47 |
| 2016/0245907 A1* | 8/2016 | Parker ..................... | F41H 11/02 |
| 2016/0288905 A1* | 10/2016 | Gong ...................... | G06F 16/29 |
| 2017/0092138 A1* | 3/2017 | Trundle ................ | B64C 39/024 |
| 2017/0192089 A1* | 7/2017 | Parker ..................... | G01S 3/782 |
| 2017/0224214 A1* | 8/2017 | Saigh ................... | A61B 5/0022 |

(Continued)

*Primary Examiner* — Erin F Heard
*Assistant Examiner* — Helena H Seraydaryan
(74) *Attorney, Agent, or Firm* — The Small Patent Law Group LLC; Joseph M Butscher

(57) ABSTRACT

A drone deterrence system includes a housing configured to be secured to a structure. A motion detector is disposed on or within the housing, and is configured to detect motion within a predetermined range. A tracker is disposed on or within the housing, and is configured to track motion of a drone within the predetermined range. A control unit is in communication with the motion detector and the tracker, and is configured to take action to deter the drone from remaining in the predetermined range.

15 Claims, 3 Drawing Sheets

(56) References Cited

U.S. PATENT DOCUMENTS

2017/0253330 A1* 9/2017 Saigh ................. B64C 39/024
2017/0280411 A1* 9/2017 Noonan ............... H04W 64/00

* cited by examiner

DRONE DETERRENCE SYSTEM, METHOD, AND ASSEMBLY

FIELD OF THE DISCLOSURE

Embodiments of the present disclosure generally relate to drone deterrence systems, methods, and assemblies, such as may be used to prevent or otherwise deter drones from invading residential and/or commercial locations.

BACKGROUND OF THE DISCLOSURE

In recent years, aerial drones have become available for commercial and private use. For example, certain businesses have started, or have considered, using aerial drones to deliver products to customers. An individual may order a product from a particular provider, and an aerial drone may deliver the product to the home of the individual. As such, delivery of goods to consumers is becoming quicker and more efficient due to the use of aerial drones.

At the same time, however, aerial drones may be used by unscrupulous individuals to invade the privacy of others. A drone may be purchased by an individual and used to spy on others. For example, the drone may be flown over a yard or other such property of another and used to acquire video or images of the yard without consent. Further, the drone may be maneuvered into close proximity of a window of a residence and used to acquire images or video of the residence through the window.

In short, the use of drones has grown exponentially and will likely continue to grow in the upcoming years. Unfortunately, however, drones may also be used for unauthorized and even nefarious purposes, such as spying or otherwise invading the privacy of others.

SUMMARY OF THE DISCLOSURE

A need exists for a system and method of deterring unauthorized use of drones. A need exists for preventing, minimizing, or otherwise reducing the possibility of a drone being used to invade the privacy of individuals.

With those needs in mind, certain embodiments of the present disclosure provide a drone deterrence system that includes a housing configured to be secured to a structure. A motion detector is disposed on or within the housing, and is configured to detect motion within a predetermined range. A tracker is disposed on or within the housing, and is configured to track motion of a drone within the predetermined range. A control unit is in communication with the motion detector and the tracker, and is configured to take action to deter the drone from remaining in the predetermined range. In at least one embodiment, the tracker is activated in response to the motion detector detecting the motion within the predetermined range.

The drone deterrence system may include a camera that is configured to acquire images and/or video of the predetermined range in response to the motion detector detecting the motion within the predetermined range.

In at least one embodiment, the drone deterrence system includes a countermeasure disposed on or within the housing. The countermeasure is in communication with the control unit. The control unit is configured to take the action by operating the countermeasure to generate a disturbance in response to the motion detector detecting the motion within the predetermined range. The countermeasure may be configured to generate electromagnetic interference as the disturbance. The control unit may be configured to operate the countermeasure to generate the disturbance for a predetermined time period, and to cease generating the disturbance if the motion detector detects no motion within the predetermined range after the predetermined time period.

In at least one embodiment, the drone deterrence system includes a laser disposed on or within the housing. The laser is in communication with the control unit. The control unit is configured to take the action by operating the laser to emit laser energy into the drone while the object is within the predetermined range.

The control unit may be configured to receive motion signals from the motion detector and operate the tracker based on the received motion signals. In at least one embodiment, the control unit may be in communication with a home security system.

In at least one embodiment, the housing includes a cover secured to a base. The motion detector, the tracker, and the control unit may be mounted on the base and covered by the cover. The housing may also include a shield configured to block electromagnetic interference.

Certain embodiments of the present disclosure provide a drone deterrence method that includes securing a housing to a structure, detecting motion within a predetermined range with a motion detector disposed on or within the housing, tracking motion of a drone within the predetermined range with a tracker disposed on or within the housing, and using a control unit that is in communication with the motion detector and the tracker to take action to deter the drone from remaining in the predetermined range.

The using the control unit may include operating a countermeasure disposed on or within the housing to generate a disturbance in response to the detecting the motion within the predetermined range. The operating the countermeasure may include operating the countermeasure to generate the disturbance for a predetermined time period, and ceasing the disturbance if the motion detector detects no motion within the predetermined range after the predetermined time period.

The using the control unit may include operating a laser disposed on or within the housing to emit laser energy into the object while the object is within the predetermined range. In at least one embodiment, the control unit is configured to operate the countermeasure before operating the laser.

DETAILED DESCRIPTION OF THE DISCLOSURE

Figure 1:
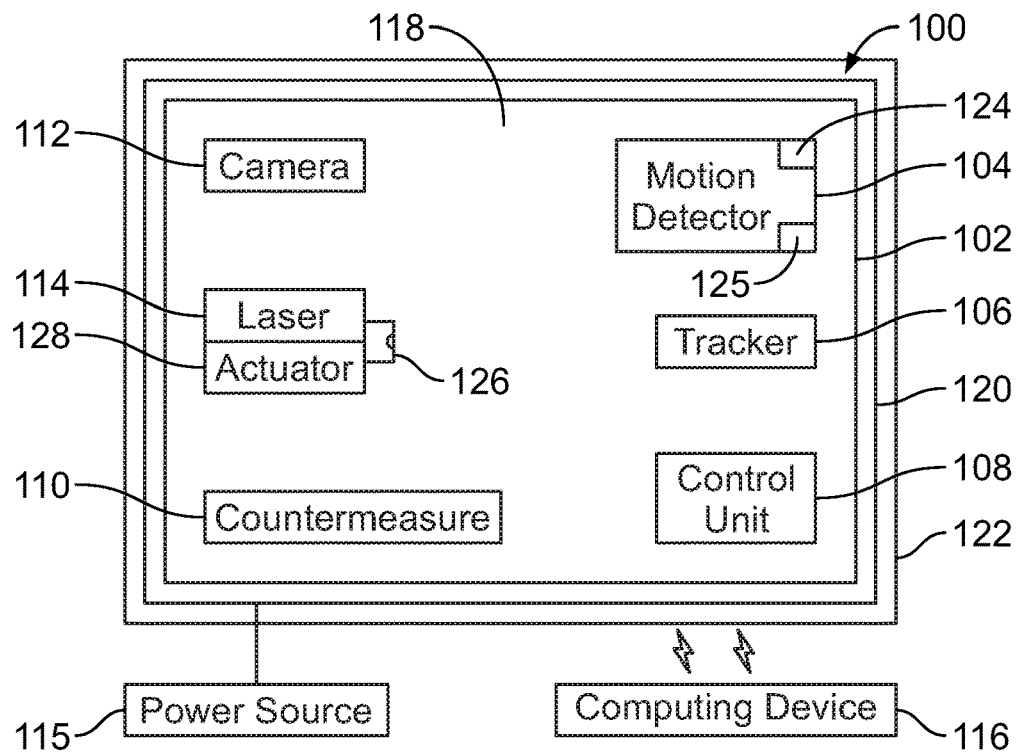
FIG. 1 is a schematic diagram of a drone deterrence system, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide drone deterrence systems and methods that are configured to prevent unauthorized use of a drone. In at least one embodiment, a drone deterrence system includes a motion detector that is configured to detect motion of a drone within a predefined distance to the drone deterrence assembly. Once a drone is detected via the motion detector, a tracker tracks the motion of the drone. A laser may then be used to prevent a sensor of the drone from acquiring video or images. In at least one embodiment, once a drone is detected via the motion detector, power is supplied to all operative components of the drone deterrence system.

Certain embodiments of the present disclosure provide a drone deterrence system that includes a housing, a motion detector disposed in the housing, and a control unit disposed in the housing. The control unit is configured to receive power in response to the motion detector detecting motion within a predetermined distance to the drone deterrence system. The housing may include a dome-shaped cover coupled to a base. The motion detector may have a range of 0-150 feet, for example. Alternatively, the range may more than 150 feet. However, the range may be limited to 150 feet in order to prevent laser energy being emitted or otherwise transferred inadvertently into an aircraft (such as commercial airlines) flying more than 150 feet away.

The drone deterrence system includes a tracker that is configured to track motion of an object that has been detected by the motion detector. For example, after the motion detector senses motion, the tracker is activated to track the motion of the object. In at least one embodiment, the tracker includes a detector assembly having four detectors (such as charge-coupled devices (CCD), complementary metal oxide semiconductors (CMOS), or the like) that are able to track a source of energy (such as a sensor of a camera) of a drone.

In at least one embodiment, the drone deterrence system includes a camera. The camera is powered in response to the motion detector detecting motion. When powered, the camera outputs a video signal, which may be viewed by an individual through a computing device (such as a personal computer, a laptop computer, a handheld device, or the like) that is in communication with the drone deterrence system, such as through one or more wired or wireless connections.

The drone deterrence system may also include a countermeasure that is configured to generate a disturbance that impairs the functionality of a camera of a drone. For example, the disturbance may be electromagnetic interference, optical interference, and/or the like.

The drone deterrence system may also include a laser moveably secured to an actuator, such as a flex mount, that allows laser energy to be guided to a particular point in space. The laser is controlled by the control unit to emit laser energy to the camera of the drone. The laser may be configured to impair the functionality of a camera sensor of the drone.

In at least one embodiment, the drone deterrence system may be linked to a home security system. A camera and monitor of the home security system may be used by the drone deterrence system. For example, the camera of the home security system may provide the camera for the drone deterrence system. Further, the monitor of the home security system may be or include a computing device used by the drone deterrence system.

Certain embodiments of the present disclosure provide a drone deterrence system and method that includes securing a housing to a structure, detecting motion within a predetermined range with a motion detector disposed on or within the housing, tracking motion of a drone within the predetermined range with a tracker disposed on or within the housing, and using a control unit that is in communication with the motion detector and the tracker to take action to deter the drone from remaining in the predetermined range. The method may also include using the drone deterrence system in conjunction with a home security system. In at least one embodiment, when the drone deterrence system detects movement of a drone, the home security system may alert an authority, such as police, fire personnel, other emergency services, or the like, such as when an owner of a property is not present.

FIG. 1 is a schematic diagram of a drone deterrence system 100, according to an embodiment of the present disclosure. The drone deterrence system 100 includes a housing 102 that retains a motion detector 104, a tracker 106, a control unit 108, a countermeasure 110, a camera 112, and a laser 114. Components of the drone deterrence system 100 (such as the motion detector 104, the tracker 106, the control unit 108, the countermeasure 110, the camera 112, and the laser 114) are disposed on and/or within the housing 102.

The drone deterrence system 100 may be connected to a power source 115, such as through one or more wires, cables, or the like. The power source 115 may be an electrical receptacle that is configured to receive an electrical plug of the drone deterrence system 100. As such, the drone deterrence system 100 may be powered via a source of standard alternating current. In at least one other embodiment, the power source 115 may include one or more batteries coupled to and/or disposed within the housing 102. The battery or batteries may be used as a power back-up, for example.

The drone deterrence system 100 may be in communication with a computing device 116 through one or more wired or wireless connections. The computing device 116 may be a personal computer, a laptop computer, a handheld device (such as a smart phone), and/or the like that is remotely located from the drone deterrence system 100.

In at least one embodiment, the housing 102 includes a cover 118 secured to a base 120. The cover 118 may be a dome formed of polycarbonate, acrylic, a transparent plastic, glass, or the like. The base 120 may include a plastic base that may be or include a circuit board onto which various components of the drone deterrence system 100 (such as the motion detector 104, the tracker 106, the control unit 108, the countermeasure 110, the camera 112, and the laser 114) are mounted. The base 120 may also include a shield 122 on a surface that is opposite from the surface on which the components are mounted. The shield 122 may include a metallic layer (such as a metallic foil) that is configured to block electromagnetic interference from passing therethrough (so as to protect home appliances, electronic devices, and/or the like).

The motion detector 104 is disposed on or within the housing 102 and may include one or more sensors 124 that are configured to detect motion within a predetermined range. For example, the sensors 124 may be infrared sensors, ultrasonic sensors, thermal sensors, and/or the like that are configured to detect motion. The predetermined range may be a distance from the drone deterrence system 100 in which privacy is desired. For example, the predetermined range may be 50 feet. In at least one other embodiment, the predetermined range may be between 0-150 feet.

The tracker 106 is disposed on or within the housing 102 and may include one or more detectors that are configured to track motion of an object. For example, the tracker 106 may include one or more CCD, CMOS, or other such detectors that are configured to track motion of an energy source. In at least one embodiment, the tracker 106 is configured to track motion of an energy source, such as a sensor of a camera of a drone.

The control unit 108 is disposed on or within the housing 102 and is operatively coupled to the motion detector 104, the tracker 106, the countermeasure 110, the camera 112, and the laser 114. The control unit 108 is configured to control operation of the drone deterrence system 100. The control unit 108 is in communication with the motion detector 104 and the tracker 106, and is configured to take action to deter a drone from remaining in a predetermined range of the motion detector 104. For example, the control unit 108 may take action by operating the countermeasure 110 to generate a disturbance, and/or operating the laser 114 to emit laser energy into the drone, as described below. The control unit 108 is also in communication with the remote computing device 116, such as through one or more wired or wireless connections. Alternatively, the control unit 108 may be remotely located from the housing 102. For example, the computing device 116 may include the control unit 108 or another control unit that is configured to control operation of the drone deterrence system 100.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 108 may be or include one or more processors that are configured to control operation of the drone deterrence system 100.

The control unit 108 is configured to execute a set of instructions that are stored in one or more storage elements (such as one or more memories), in order to process data. For example, the control unit 108 may include or be coupled to one or more memories. The storage elements may also store data or other information as desired or needed. The storage elements may be in the form of an information source or a physical memory element within a processing machine.

The set of instructions may include various commands that instruct the control unit 108 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 108. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, EPROM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 108 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, OTP (one time programmable) memory, and non-volatile RAM (NVRAM) memory. The above memory types are exemplary only, and are thus not limiting as to the types of memory usable for storage of a computer program.

The countermeasure 110 is disposed on or within the housing 102 and configured to generate a disturbance that is configured to impair operation of a drone camera. For example, the countermeasure 110 may be a source of electromagnetic interference (EMI) that temporarily disables operation of a drone camera. In at least one other embodiment, the countermeasure 110 may be or include one or more lasers that are configured to generate optical interference (for example, a monochromatic optical interference pattern such as an optical veil in front of a drone camera) that prevents a drone camera from acquiring images therethrough. In at least one embodiment, the countermeasure 110 generates the disturbance for a predetermined time period, such as 5 seconds. If after the predetermined time period the motion detector 104 no longer detects motion within the predetermined range, the countermeasure 110 ceases generating the disturbance (for example, the control unit 108 controls the countermeasure 110 to cease the disturbance). If, however, there is still motion after the predetermined time period, the countermeasure 110 may continue to generate the disturbance for an additional predetermined time period and/or the laser 114 may be activated to emit laser energy into the moving object, and the process repeats. Alternatively, the drone deterrence system 100 may not include the countermeasure 110.

The camera 112 may be disposed on or within the housing 102. The camera 112 may be a digital camera that is configured to acquire video and/or images within a field of view. The camera 112 may be a CCD, CMOS, or digital camera that is configured to acquire video. The camera 112 may output the image and/or video signals to the computing device 116 (such as through one or more wired or wireless connections) so that an individual may view the images and/or video at the location of the computing device 116. In at least one other embodiment, the camera 112 may not be disposed within the housing 102. Instead, the camera 112 may be a separate and distinct camera (such as one of a security system) that is in communication with the control unit 108 and/or the computing device 116 through one or more wired or wireless connections. Alternatively, the drone deterrence system 100 may not include the camera 112.

The laser 114 is disposed on or within the housing 102 and may include a light emitter 126 moveably secured to an actuator 128. The control unit 108 is configured to operate the laser 114. The actuator 128 may be a flex mount that is configured to allow the light emitter 126 to be directed towards a moving target. The actuator 128 may include one or more gimbals operatively connected to one or more motors (such as one or more servo motors, electric motors, and/or the like). In other embodiments, the actuator 128 may include gears, hinges, pulleys, rotary motors, pistons, cylinders, microelectromechanical (MEM) devices, and/or the like that are configured to direct the light emitter 126 towards a target so that laser energy emitted from the light emitter 126 impinges on the target.

In operation, power is initially supplied to the motion detector 104. If no motion is sensed by the sensor(s) 124 of the motion detector 104, power may not be supplied to the other components of the drone deterrence system 100. For example, the motion detector 104 may include a switch 125 that is triggered when the sensor(s) 124 detect motion within the predetermined range. The switch 125 sends an activation signal (such as when the switch 125 closes) to the control unit 108 to wake up, thereby activating the control unit 108 and the other components of the drone deterrence system 100. Alternatively, power may be supplied to components of the drone deterrence system 100 at all times. For example, power may be supplied to all of the components of the drone deterrence system 100 even when the motion detector 104 does not detect motion within the predetermined range.

Once motion is detected, the tracker 106 tracks the motion of the object moving within the predetermined range. The tracker 106 may focus on an energy source (such as a sensor of a camera of a drone) and follow the motion of the energy source. The tracker 106 outputs a tracking signal to the control unit 108. The tracking signal provides information to the control unit 108 regarding the motion of the object.

In response to the control unit 108 receiving the tracking signal 108, the control unit 108 may operate the camera 112 to acquire video of the moving object. The camera 112 outputs the video signal to the computing device 116, which allows an individual to view the moving the object. The control unit 108 may then prompt an individual to input a command through the computing device 116. The individual may input an action command, such as a laser disruption command and/or a countermeasure command, through the computing device 116. For example, the individual may view the video acquired by the camera 112 and see that the moving object is a bird or squirrel, and decide no further action is necessary. If, however, the individual sees that the moving object is a drone, the individual may input an action command. In at least one other embodiment, the control unit 108 may automatically operate without any input from an individual to take action, such as by first causing the countermeasure 110 to generate a disturbance, and after a predetermined time period (if the object is still within the predetermined range), causing the laser 114 to emit laser energy into the moving object.

The control unit 108 receives the action command from the computing device 116. The action command may include a laser disruption signal or command. In response to receiving the laser disruption command, the control unit 108 may operate the laser 114 to emit laser energy into the moving object. The control unit 108 operates the laser 114 in conjunction with the tracker 106 to emit laser energy into the tracked energy source of the moving object. For example, the emitted laser energy may be emitted into a sensor of a camera of a drone, which prevents or otherwise impairs the camera of the drone from acquiring images or video. The emitted laser energy may be sufficient to temporarily impair the camera of the drone, such as during the time the laser energy is emitted into the sensor of the camera. Optionally, the emitted laser energy may be configured to permanently disable a camera of a drone.

The action command may include a countermeasure command or signal. In response to receiving the countermeasure command, the control unit 108 operates the countermeasure to generate a disturbance that impairs the camera of the drone. For example, the disturbance may be EMI that prevents the camera from functioning. In at least one other embodiment, the disturbance may be generated by one or more lights that generate optical interference that forms a virtual curtain through which a camera of a drone may not acquire images or video. The shield 122 blocks the disturbance from being directed behind the drone deterrence system 100 (such as into a building onto which the drone deterrence system 100 is mounted). Alternatively, the drone deterrence system 100 may not include the shield 122.

In at least one embodiment, the control unit 108 may operate the countermeasure 110 before the laser 114. For example, the control unit 108 may operate the countermeasure 110 for a predetermined period of time (such as 5 seconds). If the drone moves out of the predetermined range of the motion detector 104 within the predetermined period of time, the control unit 108 refrains from operating the laser 114. If, however, the drone is still within the predetermined range of the motion detector 104 after the predetermined range of time, the control unit 108 then operates the laser 114. Optionally, the predetermined period of time may be greater or less than 5 seconds. In at least one other embodiment, the drone deterrence system 100 may include the laser 114, but not the countermeasure 110. In at least one other embodiment, the drone deterrence system 100 may include the countermeasure 110, but not the laser 114.

In at least one other embodiment, the drone deterrence system 100 may not include the camera 112. Instead, the control unit 108 may automatically take action (such as by operating the laser 114 and/or the countermeasure, as described above) without input from an individual. For example, when the motion detector 104 detects motion within the predetermined range, the control unit 108 may automatically control the laser 114 to emit laser energy towards a source of energy of the moving object (in conjunction with the motion of the object tracked by the tracker 106), and/or the countermeasure 110 to emit the disturbance.

When the motion detector 104 no longer detects motion within the predetermined range, the control unit 108 deactivates the countermeasure 110 and the laser 114. Further, the control unit 108 may also deactivate the camera 112. In at least one embodiment, when the motion detector 104 no longer detects motion within the predetermined range, all of the components of the drone deterrence system 100 may be deactivated (for example, power may no longer be supplied) with the exception of the motion detector 104.

Figure 2:
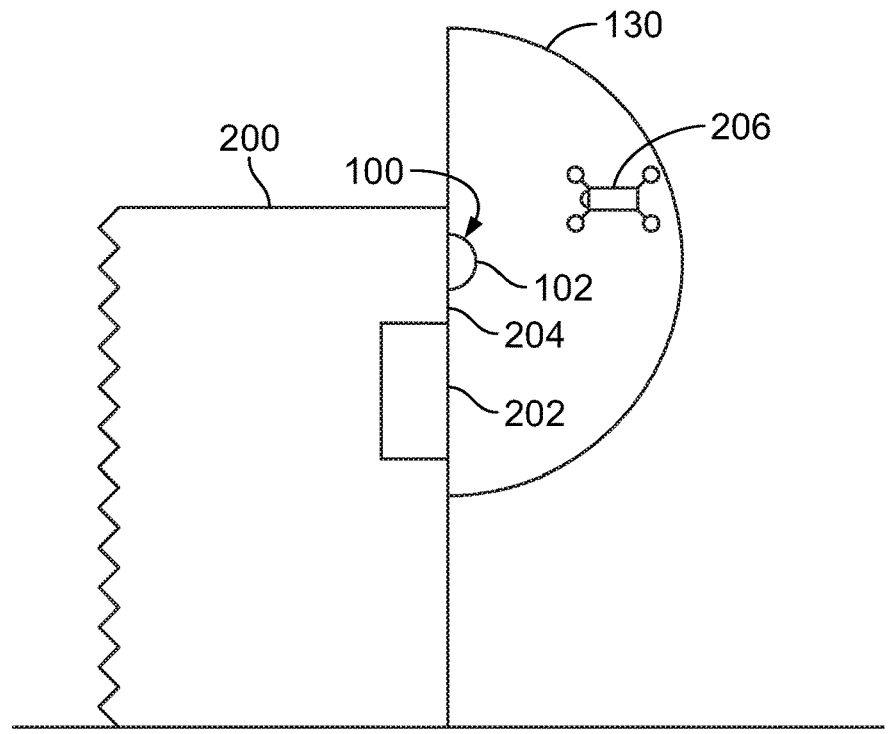
FIG. 2 is a simplified diagrammatic representation of a drone deterrence system mounted on a structure, according to an embodiment of the present disclosure.

FIG. 2 is a simplified diagrammatic representation of the drone deterrence system 100 mounted on a structure 200, according to an embodiment of the present disclosure. The structure 200 may be a residential or commercial building having a window 202. Optionally, the structure 200 may be any structure within an area in which privacy is desired. For example, the structure 200 may be a tree, wall, rock, or the like within a backyard of a private residence, a mounting assembly (such as a pole, bracket, post, or the like), or even a floor or ground within an area.

As shown in FIG. 2, the drone deterrence system 100 is mounted above the window 202. Referring to FIGS. 1 and 2, the motion detector 104 has a predetermined range 130 that extends from a mounting surface 204 of the structure 200 to a desired zone of privacy, which extends above, below, and outwardly from the window 202. The predetermined range 130 may be determined by an individual and programmed into the motion detector 104 by way of the control unit 108. When an object 206 moves within the predetermined range 130, the motion detector 104 detects such motion, and the drone deterrence system 100 operates as described above with respect to FIG. 1.

In at least one other embodiment, the structure 200 may be a moving structure, such as a vehicle. For example, the drone deterrence system 100 may be mounted onto an automobile, truck, train, airplane, watercraft, or the like.

The housing 102 may be mounted to the structure, such as through one or more fasteners, adhesives, and/or the like. In at least one embodiment, the base 120 includes a three point support assembly that allows the drone deterrence system 100 to be mounted on various surfaces, such as a slanted roof of a private residence proximate to a window.

Figure 3:
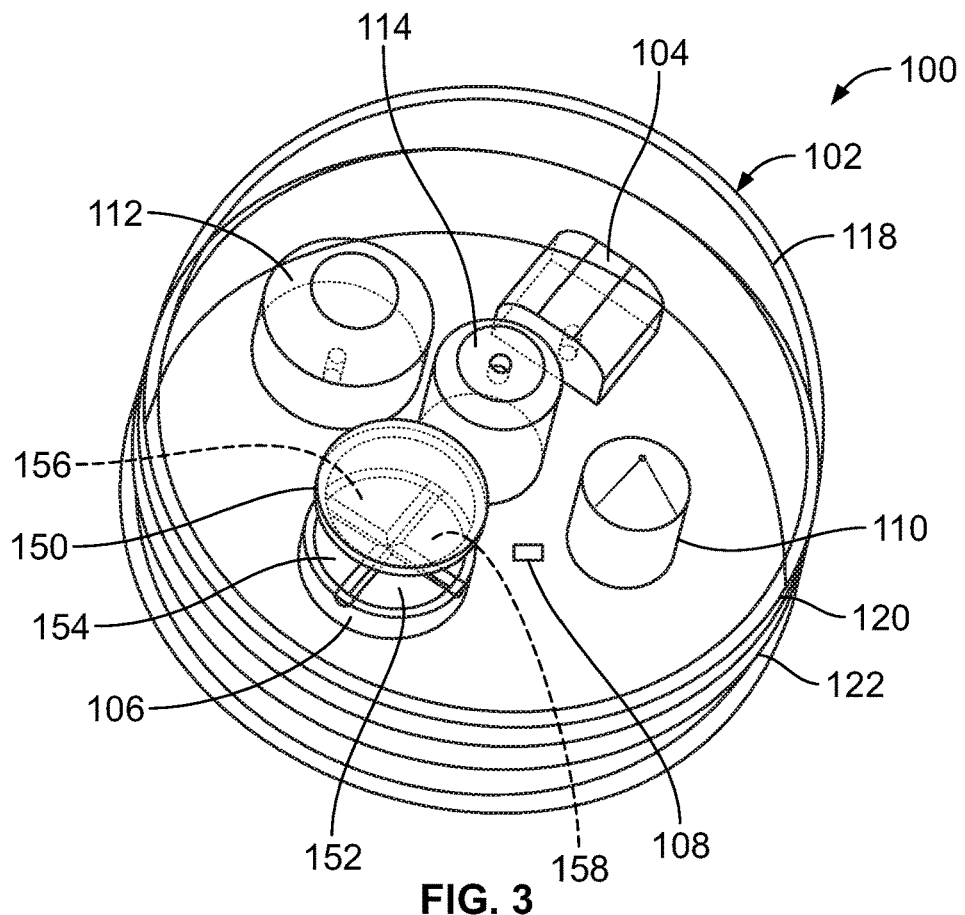
FIG. 3 is a diagrammatic representation of a top perspective view of a drone deterrence system, according to an embodiment of the present disclosure.
Figure 4:
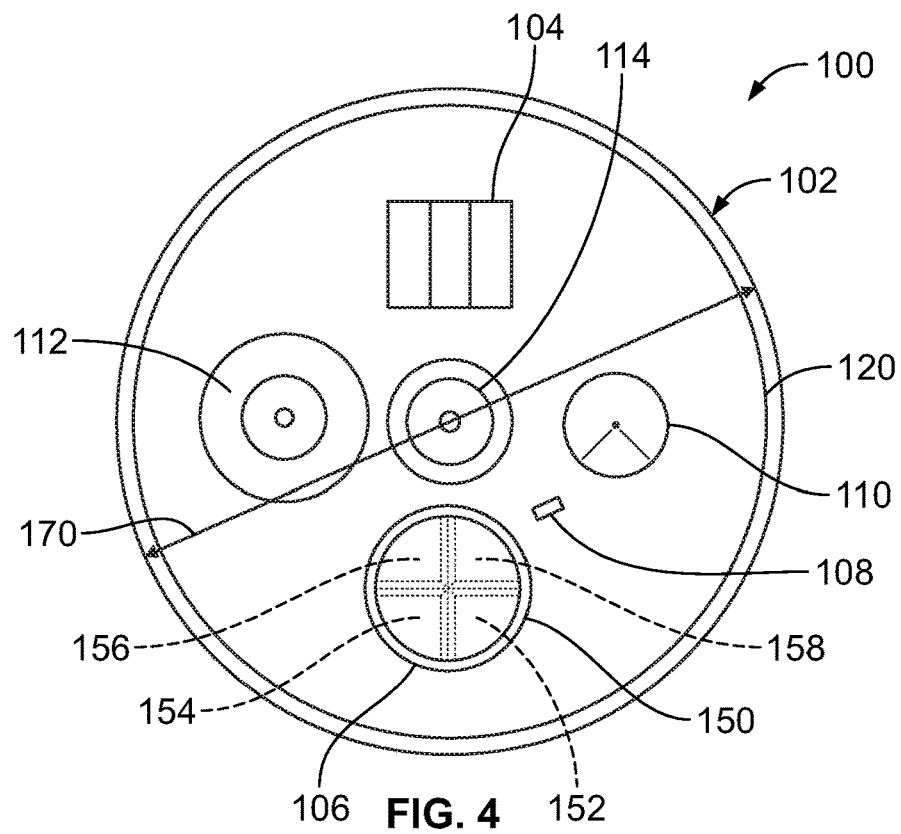
FIG. 4 is a diagrammatic representation of a top plan view of a drone deterrence system, according to an embodiment of the present disclosure.

FIG. 3 is a diagrammatic representation of a top perspective view of the drone deterrence system 100, according to an embodiment of the present disclosure. FIG. 4 is a diagrammatic representation of a top plan view of the drone deterrence system 100. Referring to FIGS. 3 and 4, the tracker 106 may include a lens 150 positioned above four CCD detector segments 152, 154, 156, and 158, each of which is arranged to track movement within a quadrant of space. The lens 150 may focus energy from a drone (such as light energy emanating from a camera sensor of a drone) into the detector segments 152, 154, 156, and 158. The tracker 106 tracks the motion of the energy from the drone via the location of the energy with respect to the quadrants defined by the detector segments 152, 154, 156, and 158. Optionally, the tracker 106 may include more or less detector segments than shown. In at least one other embodiment, the tracker 106 may include one or more thermal detectors that track motion of the drone by tracking heat energy emitted by the drone. In at least one other embodiment, the tracker 106 may include one or more ultrasonic sensors that are configured to track motion of an object. In at least one other embodiment, the tracker 106 may include a radar assembly or a LIDAR assembly that is configured to track motion of an object.

The cover 118 may be colored (such as coated with paint, covered with a reflective surface, and/or the like) to conceal the internal components of the drone deterrence system 100. The cover 118 may include a thin film coating (for example, an anti-reflection coating) such that laser energy emitted by the laser 114 is not internally reflected. For example, the cover 118 may be have a coating that allows the laser energy to pass therethrough, but otherwise conceals the internal components of the drone deterrence system 100. In at least one embodiment, the laser 114 is configured to emit laser energy at a wavelength corresponding to the color green, and the cover 118 may have a coating that allows the emitted laser energy to pass therethrough. In at least one other embodiment, the cover 118 may not be colored, but may instead be clear and transparent. The inside surface of the cover 118 may be covered with an anti-reflection coating that is configured to allow laser energy emitted by the laser 114 to pass therethrough, and also conceal the components of the drone deterrence system 100 secured within the housing 102.

The drone deterrence system 100 may be contained within the housing 102, which is compact. For example, a diameter 170 of the base 120 may be 12 inches or less. The diameter of the cover 118 may be of a similar size. As such, the drone deterrence system 100 provides a compact assembly that is configured to be discretely mounted to a structure. Alternatively, the diameter 170 of the base 120 may be greater than 12 inches.

Figure 5:
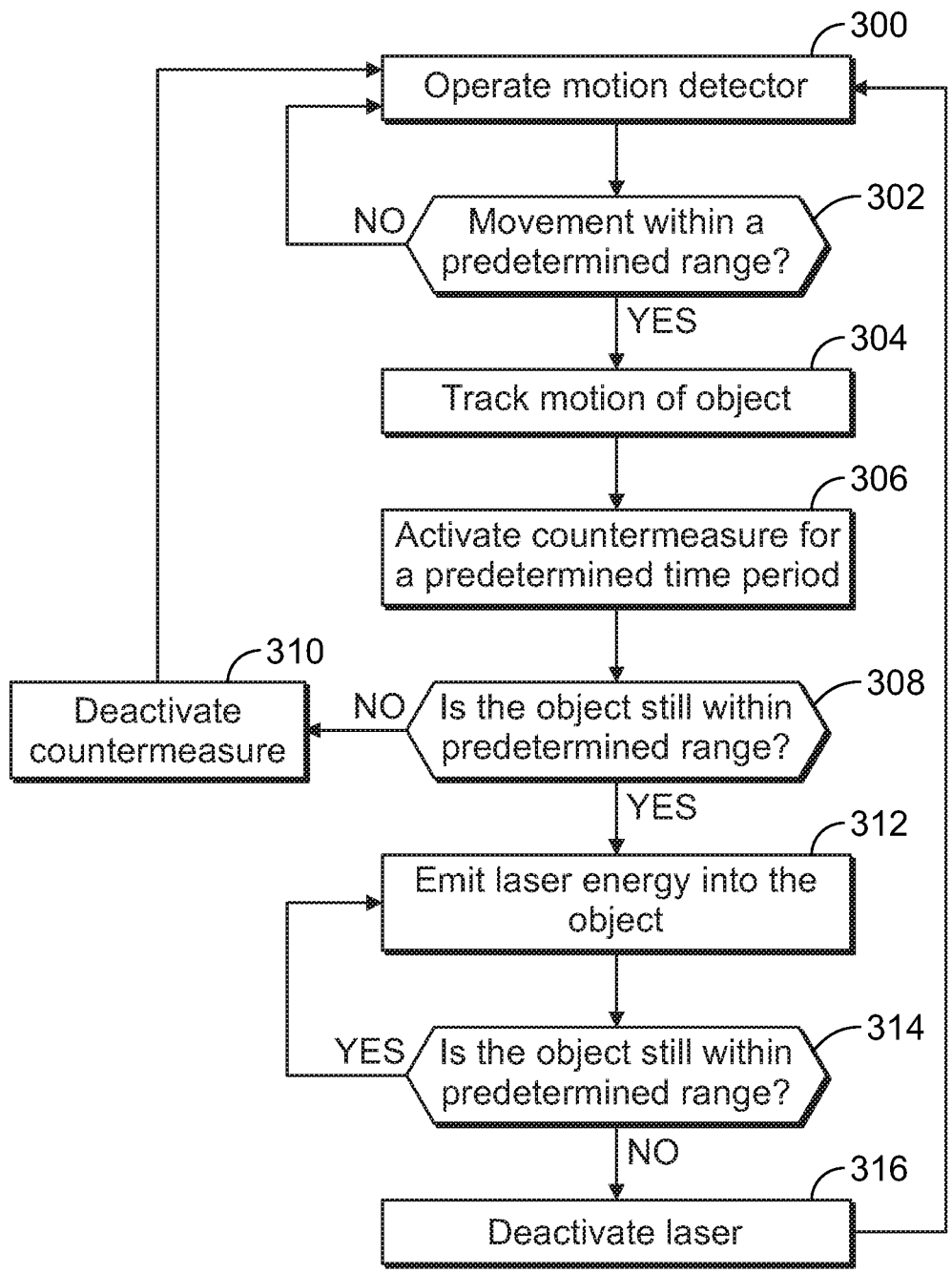
FIG. 5 illustrates a flow chart of a method of operating a drone deterrence system, according to an embodiment of the present disclosure.

FIG. 5 illustrates a flow chart of a method of operating a drone deterrence system, according to an embodiment of the present disclosure. Referring to FIGS. 1 and 5, in at least one embodiment, the control unit 108 is configured to operate the drone deterrence system 100 based on the flow chart of FIG. 5.

At 300, the motion detector 104 is operated to detect motion within a predetermined range. At 302, based on motion signals output from the motion detector 104, the control unit 108 determines whether or not there is movement within the predetermined range. If there is no motion within the predetermined range, the method returns to 300.

If, however, there is movement within the predetermined range, the method proceeds from 302 to 304, in which motion of the object within the predetermined range is tracked by the tracker 106. At the same time, the camera 112 may be activated to output a video signal of the moving object within the predetermined range to the computing device 116. As the motion of the object is being tracked, the control unit 108 may then activate the countermeasure 110 for a predetermined time period (such as 5 seconds) at 306.

At 308, the control unit 108 determines whether the object is still within the predetermined range, based on tracking signals output by the tracker 106 and/or motion signals output by the motion detector 104. If the object is not within the predetermined range, the method proceeds from 308 to 310, in which the countermeasure is deactivated, and the method returns to 300.

If, however, the control unit 108 determines that the object is still within the predetermined range at 308, the method proceeds from 308 to 312, in which the control unit activates the laser 114 to emit laser energy into the object. At 314, the control unit 108 then determines if the object is still within the predetermined range. If the object is still in the predetermined range, the method returns to 312 from 314.

If, however, the object is no longer within the predetermined range at 314, the method proceeds from 314 to 316, in which the laser is deactivated. The method then returns to 300 from 316.

As described above, embodiments of the present disclosure provide systems and methods of deterring unauthorized use of drones. Embodiments of the present disclosure provide systems and methods that prevent, minimize, or otherwise reduce the possibility a drone being used to invade the privacy of individuals.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical (or various other angles or orientations), and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A drone deterrence system comprising:
   a housing configured to be secured to a structure;
   a motion detector disposed on or within the housing, wherein the motion detector is configured to detect motion within a predetermined range;
   a tracker disposed on or within the housing, wherein the tracker is configured to track motion of a drone within the predetermined range;
   a control unit in communication with the motion detector and the tracker, wherein the control unit is configured to take at least one action to deter the drone from remaining in the predetermined range;
   a countermeasure disposed on or within the housing, wherein the countermeasure is in communication with the control unit, wherein the control unit is configured to operate the countermeasure to generate a disturbance in response to the motion detector detecting the motion within the predetermined range, wherein the countermeasure is configured to generate electromagnetic interference as the disturbance,
   a laser disposed on or within the housing, wherein the laser is in communication with the control unit, and wherein the control unit is configured to operate the laser to emit laser energy into the drone while the object is within the predetermined range; and
   wherein the control unit is configured to operate the countermeasure to generate the disturbance for a predetermined time period, and to cease generating the disturbance if the motion detector detects no motion within the predetermined range after the predetermined time period, and wherein the control unit is configured to operate the countermeasure before operating the laser.

2. The drone deterrence system of claim 1, wherein the tracker is activated in response to the motion detector detecting the motion within the predetermined range.

3. The drone deterrence system of claim 1, further comprising a camera that is configured to acquire one or both of images or video of a space, external to the camera, within the predetermined range in response to the motion detector detecting the motion within the predetermined range.

4. The drone deterrence system of claim 1, wherein the control unit is configured to receive motion signals from the motion detector and operate the tracker based on the received motion signals.

5. The drone deterrence system of claim 1, wherein the housing comprises a cover secured to a base, wherein the motion detector, the tracker, and the control unit are mounted on the base and covered by the cover.

6. The drone deterrence system of claim 5, wherein the housing further comprises a shield configured to block electromagnetic interference.

7. The drone deterrence system of claim 1, wherein the control unit is in communication with a home security system.

8. The drone deterrence system of claim 1, wherein the tracker comprises one or more detectors that track motion of a camera of a drone.

9. A drone deterrence method comprising:
   securing a housing to a structure;
   detecting motion within a predetermined range with a motion detector disposed on or within the housing;
   tracking motion of a drone within the predetermined range with a tracker disposed on or within the housing; and
   using a control unit that is in communication with the motion detector and the tracker to deter the drone from remaining in the predetermined range, wherein the using the control unit comprises:
      operating a countermeasure disposed on or within the housing to generate an electromagnetic disturbance in response to the detecting the motion within the predetermined range, wherein the operating the countermeasure comprises: operating the countermeasure to generate the electromagnetic disturbance for a predetermined time period, and ceasing the electromagnetic disturbance if the motion detector detects no motion within the predetermined range after the predetermined time period; and operating a laser disposed on or within the housing to emit laser energy into the object while the object is within the predetermined range, wherein the operating the countermeasure occurs before the operating the laser.

10. The drone deterrence method of claim 9, further comprising activating the tracker in response to the detecting the motion within the predetermined range.

11. The drone deterrence method of claim 9, acquiring one or both of images or video of a space, external to the camera, within the predetermined range by a camera in response to the detecting the motion within the predetermined range.

12. The drone deterrence method of claim 9, wherein the using the control unit comprises:
receiving motion signals from the motion detector; and
operating the tracker based on the received motion signals.

13. The drone deterrence method of claim 9, wherein the tracking comprises tracking motion of a camera of a drone.

14. A drone deterrence system comprising:
a housing configured to be secured to a structure, wherein the housing comprises a cover secured to a base, and a shield configured to block electromagnetic interference;
a motion detector mounted on the base and covered by the cover, wherein the motion detector is configured to detect motion within a predetermined range;
a tracker mounted on the base and covered by the cover, wherein the tracker is configured to track motion of an object within the predetermined range, wherein the tracker is activated in response to the motion detector detecting the motion within the predetermined range;
a camera that is configured to acquire one or both of images or video of a space, external to the camera, within the predetermined range in response to the motion detector detecting the motion within the predetermined range;
a countermeasure configured to generate electromagnetic interference, wherein the countermeasure is mounted on the base and covered by the cover;
a laser mounted on the base and covered by the cover; and
a control unit mounted on the base and covered by the cover, wherein the control unit is in communication with the motion detector, the tracker, the camera, the countermeasure, and the laser, wherein the control unit is configured to receive motion signals from the motion detector and operate the tracker based on the received motion signals, wherein the control unit is configured to operate the countermeasure before operating the laser, and wherein the control unit is configured to deter the object from remaining in the predetermined range by: (a) operating the countermeasure to generate an electromagnetic disturbance in response to the motion detector detecting the motion within the predetermined range, wherein the control unit is configured to operate the countermeasure to generate the electromagnetic disturbance for a predetermined time period, and to cease generating the electromagnetic disturbance if the motion detector detects no motion within the predetermined range after the predetermined time period, and (b) operating the laser to emit laser energy into the object while the object is within the predetermined range.

15. The drone deterrence system of claim 14, wherein the tracker comprises one or more detectors that track motion of a camera of a drone, and wherein the control unit is further configured to operate the laser in conjunction with the tracker to emit the laser energy into the camera of the drone.

* * * * *